Nov. 9, 1954   R. KALBAC   2,693,964
GRAVITY FED MECHANICAL SAND SPREADER
Filed Oct. 15, 1952   2 Sheets-Sheet 1
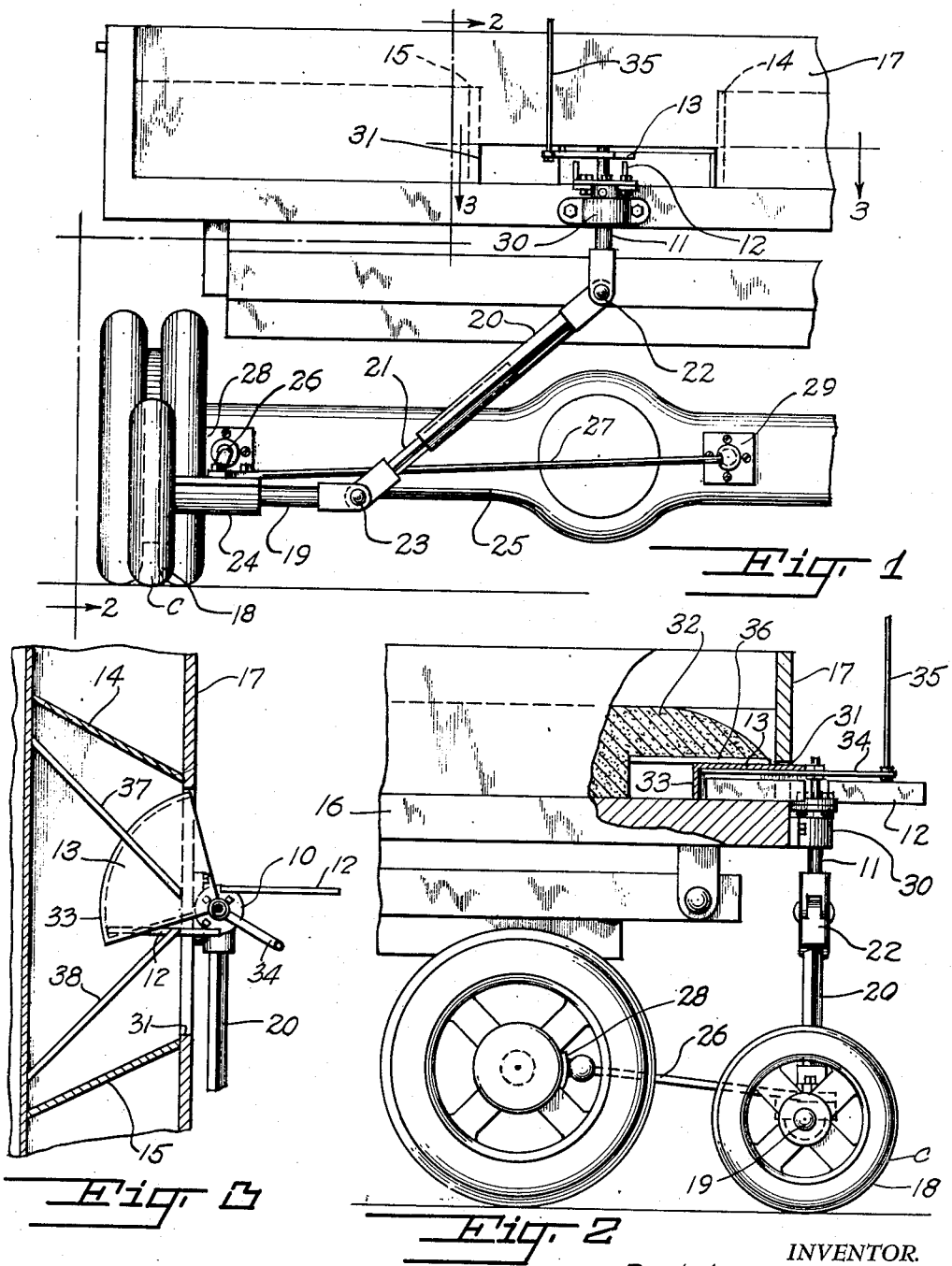
INVENTOR.
Rudolph Kalbac
BY Victor J. Evans & Co
ATTORNEYS

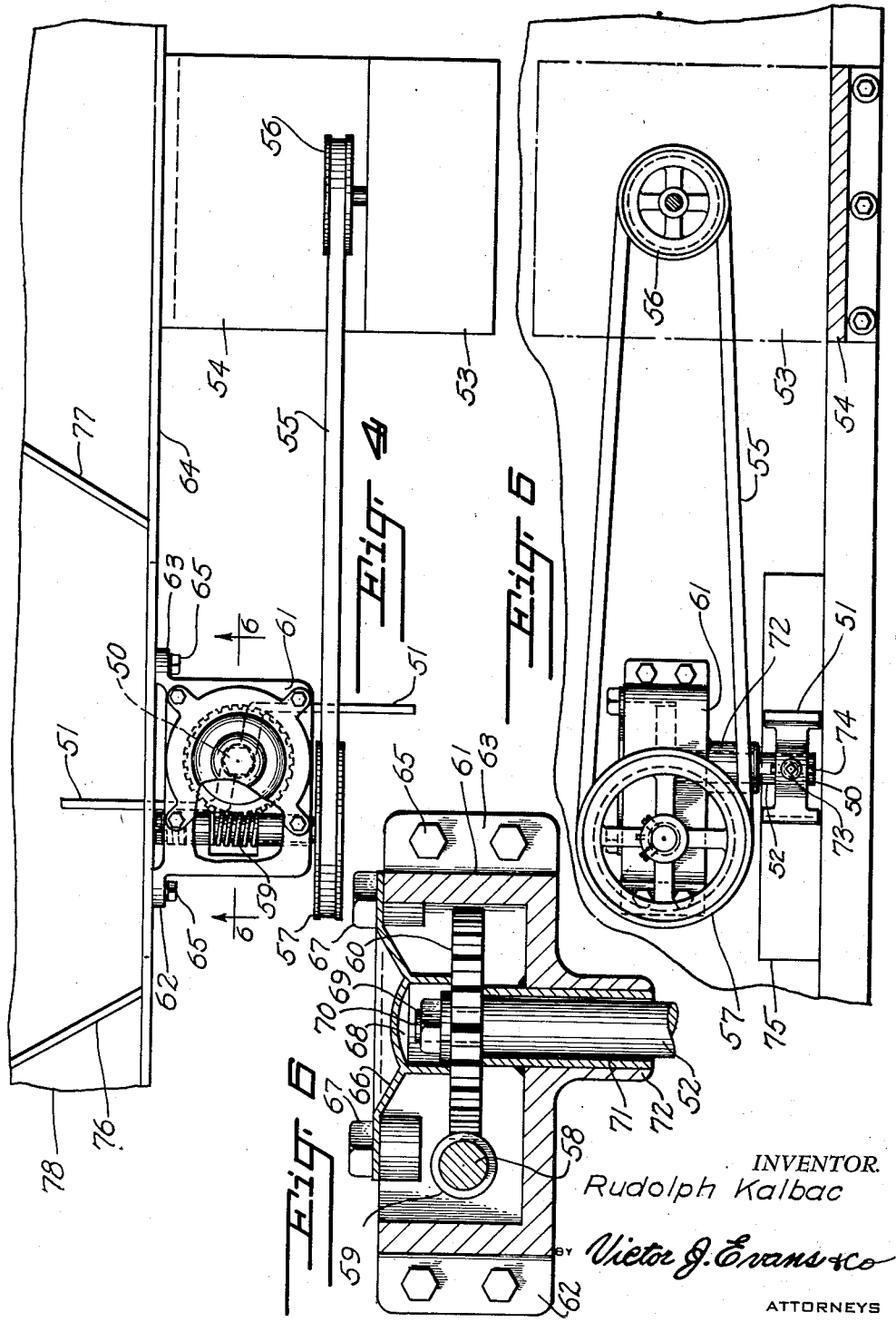

United States Patent Office 2,693,964
Patented Nov. 9, 1954

2,693,964

GRAVITY FED MECHANICAL SAND SPREADER

Rudolph Kalbac, West Willington, Conn.

Application October 15, 1952, Serial No. 314,923

2 Claims. (Cl. 275—8)

This invention relates to mechanical spreaders of the type mounted on the rear end of truck bodies, and in particular a pair of arms mounted on a vertically disposed shaft positioned in the center of the rear end of the truck body and rotated by a ground or traction wheel or by an independent motor carried by the truck body.

The purpose of this invention is to provide a spreader particularly adapted for spreading sand on icy roads in which the conventional means of shoveling sand from the truck body to the spreading device is eliminated.

In the conventional type of mechanical spreader such as is used on the rear end of truck bodies material is supplied to the spreading means by shovels and for general use two men are required to shovel material to a spreader. With this thought in mind this invention contemplates a spreader incorporated in the rear end of a truck body whereby a pair of rotating blades pick up and spread the material and wherein as the material is used the truck body is adjusted with the floor in an inclined position whereby sand or other material therein flows to the distributing or rotating blades by gravity.

The object of this invention is, therefore, to provide means for installing a rotor having radially disposed blades in the rear end of a truck body with the blades traveling in a horizontal plane and with means for rotating the blades whereby material in the body of the truck is distributed over a comparatively wide area following a truck on which the body is positioned.

Another object of the invention is to provide a mechanical spreader that is adapted to be installed in truck bodies now in use and that is adapted to be removed after use whereby the truck body may be used in a conventional manner.

A further object of the invention is to provide a mechanical spreader that is adapted to be installed in the rear end of a truck body in which material is fed from the truck body to the spreader by gravity and in which the device is of a simple and economical construction.

With these and other objects and advantages in view the invention embodies a rotor having radially disposed blades carried by a vertical shaft journaled in the trailing end of a truck body with means for rotating the blades by traction or by an independent motor and with means for directing material in the truck body to the blades.

Other features and advantages of the invention will appear from the following description taken in connection with the drawings, wherein:

Figure 1 is a rear elevational view of a truck body with a mechanical spreader installed in the body and showing a traction wheel for operating a rotor of the spreader.

Figure 2 is an elevational view taken on line 2—2 of Fig. 1 showing the rear portion of the truck body shown in Fig. 1 and in which parts are broken away and shown in section to illustrate the position of the blades of the rotor in the trailing end of the truck body.

Figure 3 is a plan view taken on line 3—3 of Fig. 1 showing the position of the spreader and also showing a gate for controlling the amount of material supplied to the spreader, the tail gate and guide baffles of the truck body being shown in section.

Figure 4 is a plan view also showing the spreader installed on the rear end of a truck body and illustrating a modification wherein the spreader is actuated by a motor mounted on the truck body.

Figure 5 is a rear elevational view of the type of spreader shown in Fig. 4 with the floor of the motor mounting platform shown in section.

Figure 6 is a cross section through the driving elements of the vertical rotor mounting shaft, being taken on line 6—6 of Fig. 4.

Referring now to the drawings wherein like reference characters denote corresponding parts, the improved spreader of this invention includes a rotor 10 mounted on a vertically disposed shaft 11 and having blades 12 extended therefrom, a gate 13 for controlling the amount of material fed to the rotor, guide baffles 14 and 15 positioned on a floor 16 of a truck body having a tail gate 17 and a traction wheel 18 mounted on a stub shaft 19 and operatively connected to the shaft 11 with a telescoping shaft formed with sections 20 and 21 and connected to the shaft 11 and stub shaft 19 with pivot joints 22 and 23 respectively.

The stub shaft 19 is journaled in a bearing 24 that is supported from the rear axle housing 25 with braces 26 and 27 and the braces are secured to the housing with sockets 28 and 29, respectively.

The shaft 11 is journaled in a bearing 30 on the end of the floor 16 of the truck body and with the shaft positioned as illustrated in Fig. 2 the radially disposed blades 12 extend through a slot 31 in the tail gate 17 whereby sand or other material, as indicated by the numeral 32 and carried in the truck body, is scraped by the blades from the truck body and distributed over an area following the truck.

The gate 13, which is in the form of a segment, is provided with a depending flange 33 and, with the gate pivotally mounted on the upper end of the shaft 11, the position thereof is readily adjusted by a handle 34 extended beyond the tail gate 17. The handle 34 may be provided with a rod or cable as indicated by the numeral 35 whereby the gate may be controlled from the driver's seat on the truck body.

A plate 36, providing a shield, is positioned above the gate 13 and the shield extends inwardly from the tail gate 17 between the guide baffles 14 and 15. The guide baffles 14 and 15 block off the corners of the truck body whereby all material in the truck body flows by gravity to the spreader with the truck tilted to an inclined position. The truck body may also be provided with guide ribs or rails, as indicated by the numerals 37 and 38.

With the parts formed in this manner the distributing blades of the spreader are rotated by the traction or ground wheel 18 whereby the blades operate continuously as the vehicle travels.

In the design illustrated in Figs. 4, 5, and 6 the rotor 50 having extended blades 51 is mounted on a vertically positioned shaft 52 and the shaft is driven by a motor 53 on a platform 54 with a belt 55 that is trained over a pulley 56 on the motor and also over a pulley 57 on a shaft 58 on which is a worm 59 that meshes with a worm gear 60 on the shaft 52.

The gears are positioned in the gear box 61 having flanges 62 and 63 by which it is attached to a tail gate 64, similar to the tail gate 17, by bolts 65.

The gear box 61 is provided with a cover plate 66 that is secured in position with cap screws 67. The cover 66 is provided with a bracket 68 in which a nut 69 is positioned, the nut being threaded on a stud 70 at the end of the shaft 52 and providing means for retaining the worm gear 60 on the shaft 52. The shaft 52 is journaled in a bearing 71 in a hub 72, depending from the gear box 61.

The hub 50 of the rotor from which the distributing blades 51 extend is secured on the lower end of the shaft 52 by a set screw 73 which extends into a keyway 74 in the lower end of the shaft, as shown in Fig. 5. The rotor is positioned whereby the blades 51 travel through a slot 75 in the lower edge of the tail gate 64 and, as illustrated in Fig. 4, a truck, which is indicated by the numeral 78, is provided with inclined baffles 76 and 77, which guide material to the rotor and blades.

With the parts formed as illustrated in Figs. 4, 5, and 6, rotation of the rotor by the motor 53 causes the blades 51 to withdraw sand from the body of the truck and distribute the sand over an area following the truck.

It will be understood that the gate 13 shown in Fig. 3 is also adapted to be used with the spreader illustrated in Figs. 4, 5, and 6.

It will be understood that other modifications, within the scope of the appended claims, may be made in the design and arrangement of the parts without departing from the spirit of the invention.

What is claimed is:

1. In a material spreader, the combination which comprises a mobile body having a floor and a vertically disposed tail gate and in which the tail gate is provided with an elongated slot positioned to extend upwardly from the floor of the body, a vertically disposed shaft, a rotor having radially positioned blades mounted on the shaft, means for journaling the shaft on the rear end of the floor of the vehicle body with the rotor positioned so that the blades are in a horizontal plane in relation to the vertical plane of the tail gate whereby the blades thereof extend through the slot of the tail gate and travel over the floor of the body at one side of the center of the shaft, means comprising a movable gate within said slot for regulating the flow of material from said body onto said rotor, a shield plate mounted in the truck body in parallel relation to said blades and spaced above said blades, and means for rotating the shaft.

2. In a material spreader, the combination which comprises a mobile body having a floor and a vertically disposed tail gate and in which the tail gate is provided with an elongated slot positioned to extend upwardly from the floor of the body, a vertically disposed shaft, a rotor having radially positioned blades mounted on the shaft, means for journaling the shaft on the rear end of the floor of the vehicle body with the rotor positioned so that the blades are in a horizontal plane in relation to the vertical plane of the tail gate whereby the blades thereof extend through the slot of the tail gate and travel over the floor of the body at one side of the center of the shaft, inclined baffles positioned on the floor of the truck body for guiding material in the truck body to the blades of the rotor, a horizontal segment journaled on said shaft and having a depending arcuate flange freely movable within said slot and positioned to extend over a path through which the blades of the rotor travel providing a gate for regulating the amount of material fed to the rotor, means for adjusting the position of the segment, a shield plate mounted in the truck body in parallel relation to said blades and segment and spaced above said blades and segment and within said baffles, and means for rotating the shaft.

References Cited in the file of this patent

UNITED STATES PATENTS

| Number | Name | Date |
| --- | --- | --- |
| 1,769,302 | MacGregor | July 1, 1930 |
| 2,232,481 | Schroder | Feb. 18, 1941 |
| 2,287,080 | Arndt | June 23, 1942 |
| 2,421,211 | Lutz | May 27, 1947 |
| 2,521,888 | Wilson | Sept. 12, 1950 |

FOREIGN PATENTS

| Number | Country | Date |
| --- | --- | --- |
| 24,249 | Great Britain | Oct. 23, 1912 |
| 547,785 | France | Oct. 3, 1922 |